United States Patent [19]

Christie

[11] 4,426,778
[45] Jan. 24, 1984

[54] DEVICE FOR STRIPPING WIRE AND CABLE

[75] Inventor: Walter E. Christie, Derry, N.H.

[73] Assignee: Avco Corporation, Wilmington, Mass.

[21] Appl. No.: 330,246

[22] Filed: Dec. 14, 1981

[51] Int. Cl.³ .............................................. H02G 1/12
[52] U.S. Cl. .................................................. 30/90.1
[58] Field of Search ............... 81/9.5 R, 9.5 A, 9.5 B, 81/9.5 C; 30/90.1, 91.1, 91.2, 90.6, 90.7, 90.8

[56] References Cited

U.S. PATENT DOCUMENTS

| | | | |
|---|---|---|---|
| 1,801,706 | 3/1931 | Westfall | 81/9.5 R |
| 2,385,368 | 9/1945 | Montgomery | 30/91.2 |
| 2,695,537 | 11/1954 | Imman et al. | 81/9.5 B |
| 2,787,177 | 4/1957 | Frye | 30/91.2 |
| 2,894,424 | 7/1959 | Vaughan | 30/91.2 |
| 2,932,224 | 4/1960 | Peed, Jr. et al. | 30/91.2 |
| 3,161,088 | 12/1964 | Tolman | 81/9.5 C |

FOREIGN PATENT DOCUMENTS

| | | | |
|---|---|---|---|
| 64176 | 9/1949 | Netherlands | 30/91.2 |
| 1285664 | 8/1972 | United Kingdom | 81/9.5 R |

Primary Examiner—Roscoe V. Parker
Attorney, Agent, or Firm—Ralph D. Gelling

[57] ABSTRACT

A device is provided which is useful in stripping wires and cables having a non-uniform outer contour. A single point knife blade is mounted on a lever arm adjacent an adjustable cam. The knife assembly is mounted on an elongated tool body having an axial passage to receive the wire or cable. The knife blade is resiliently biased into cutting contact with the cable to a depth limited by engagement of the cam with the outer contour of the cable. As the tool is rotated, the cam rides over the external contour of the cable thereby maintaining a fixed depth of cut in spite of the non-uniform contour.

6 Claims, 3 Drawing Figures

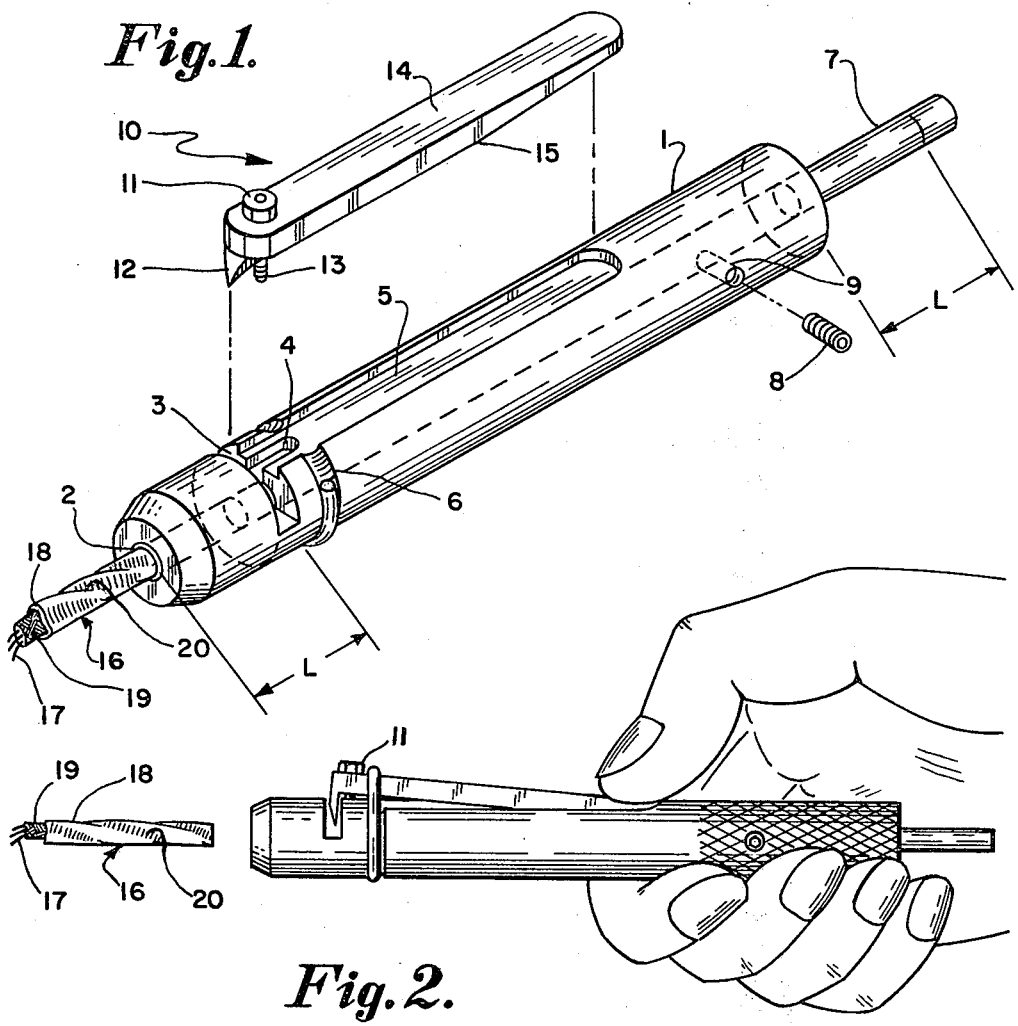
Fig.1.
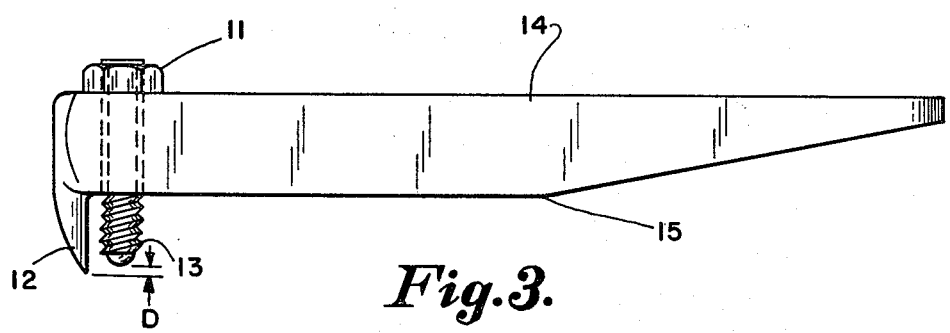
Fig.2.
Fig.3.

DEVICE FOR STRIPPING WIRE AND CABLE

BACKGROUND OF THE INVENTION

The basic types of wire strippers well known in the prior art are illustrated in U.S. Pat. Nos. 2,385,368, 2,695,537, 2,894,424 and 2,932,224. The latter two patents show tweezer or plier-like cutting tools having upper and lower cutting blades which are biased apart. In operation, the wire is placed between the blades and the tool is manually closed to cut into the insulation. By rotating the tool about the wire or cable, a relatively uniform gash may be made through the wire insulation.

The earlier two patents describe tubular devices through which the wire is inserted. Single point type blades extend into the inner part of the tubular device to engage the wire. The blade is biased away from the wire, but is mechanically forced by means of a screw thread into cutting relation with the wire at a predetermined depth.

All of these wire strippers are effective for use with wire and cable having a uniformly cylindrical outer shell, but will result in damage to the internal conductors if the contour of the outer shell is irregular. This is because, in each instance, the blade is substantially fixed with respect to the wire surface. Examining, in particular, the patent, Imman et al, U.S. Pat. No. 2,695,537, a device is shown having a blade that, once adjusted, will be fixed with respect to the wire surface. If the outer contour of the wire was undulating, as shown in FIG. 1, the blade would either miss the low portions or cut more deeply into the higher portions. Either way it is observed that undesirable operation occurs.

It is, therefore, an object of this invention to provide a stripping tool which will be effective to uniformly slice a cable having an irregular outer surface.

SUMMARY OF THE INVENTION

In order to accomplish the above object, a device is constructed having a tubular body with a central longitudinal passage. The passage is constructed to receive wire for the stripping operation. A knife blade is fixed to an elongated lever arm which is, in turn, mounted on the tubular body for radial pivotal movement. The blade extends through a slot in the body into the interior passage to engage the outer insulating shell of the wire or cable. The lever is resiliently biased to urge the knife edge radially inward. A cam is adjustably mounted immediately adjacent the knife blade and extends radially inward to engage the outer contour of the wire. By adjusting the radial depth of the cam, the cutting depth of the blade may be chosen. The cam rides on the surface of the cable as the tool is rotated thereby allowing the knife blade to maintain a uniform cutting depth.

DESCRIPTION OF THE DRAWING

The subject invention is described in more detail below with reference to the attached drawing and in said drawing:

FIG. 1 is an exploded perspective view of a wire stripping device incorporating this invention;

FIG. 2 is a plane view of the device showing operation of the invention; and

FIG. 3 is a plane view of the blade assembly of this invention.

DESCRIPTION OF THE PREFFERED EMBODIMENT

A special cable 16 of the type used extensively in aerospace and defense applications is shown in FIG. 1 having an insulating jacket 18, shield 19, and conductors 17. This cable is characterized by its non-uniform undulating outer contour 20. The subject invention was developed to overcome problems arising when the conductors 17 of this type of wire are to be exposed by stripping an end of insulating jacket 18. Care must be used to protect the shielding 19 and the conductors 17 from abrasion.

As shown in FIG. 1 the tool of this invention consists of a tubular body 1 which is constructed with an axial inner passage 2 adapted to receive the cable 16. A knife assembly 10 is mounted on the body 1 within a shallow recess 5. A knife slot 3 is cut into the body to allow access to the cable 16. The length (L) of the cable to be stripped may be accurately chosen by means of an adjustable gauge rod 7 which is inserted into the opposite end of the axial passage 2 and acts as a stop for insertion of the cable 16. The exterior end of rod 7 can be calibrated to show its position in terms of the length of cable to be stripped. Gauge rod 7 may be held in place by means of a set screw 8 mounted in threaded hole 9 in the tool body 1.

As shown in FIG. 3, the knife assembly 10 consists of a flat lever arm 14 having a knife blade 12 fixed to its forward end. The knife blade 12 should have a narrow point of contact. The lower surface of lever arm 14 is angled as shown to provide a pivot point 15. A cam 13 is also mounted on the lever arm 14 in a position longitudinally spaced a short distance behind the blade 12. The cam 13 may consist of the rounded end of a set screw 11 which is adjustably mounted on the lever arm 14. The cam 13 should be mounted as close to the blade 12 as possible so that they each engage a similar contour on the cable. By adjusting the length of the cam 13 relative to the length of the knife blade 12, the depth of the cut (D) may be accurately controlled. A cam slot 4 is formed on the body 1 adjacent the knife slot 3 to allow the cam 13 to engage cable 16.

In operation the knife assembly 10 is held in place within recess 5 by a resilient O-ring 21 which fits into groove 6 on tool body 1. By pressing on the rear end of lever arm 14, the knife blade 12 and cam 13 may be retracted against the force of O-ring 21 from their respective slots 3 and 4 to allow the cable to be inserted up to the end of gauge rod 7. The lever arm 14 is then released, allowing the force of O-ring 21 to cause the knife blade 12 to cut into the insulating jacket 18 to a depth (D) at which the cam 13 engages the outer contour 20. As the tool is rotated, cam 13 rides on the contour 20 and maintains the depth of cut (D) at a constant value in spite of the uneven nature of contour 20.

The tool of this invention therefore provides a simple and easy way to strip wire or cable in a very accurate manner, in spite of the outer contour of the cable, and without any damage to shields or conductors.

I claim as my invention:

1. A tool for stripping the outer insulating jacket from a portion of wire or cable comprising:
    an elongated body having a longitudinally extending passage constructed therein to receive the cable, said body being constructed with a transverse aperture to provide access to the cable;

a lever arm mounted on the body for manually actuated pivotal movement and constructed with a transversely fixed knife blade situated to pivot into and out of cutting engagement with the outer insulating jacket of the cable through the access aperture;

a cam transversely mounted on the lever arm adjacent to the knife blade to pivot into and out of contact engagement with the outer insulating jacket of the cable through the access aperture to limit the cutting engagement of the knife blade, said cam having substantially a point contact with said cable; and means mounted on the body to resiliently bias said lever arm and knife blade into cutting engagement with the outer insulating jacket of the cable.

2. A tool for stripping the outer insulating jacket from a portion of wire or cable as described in claim 1 further comprising:

means operatively associated with the cam to adjust the transverse position of the cam relative to the knife blade thereby providing for adjustment of the cutting engagement of the knife blade.

3. A tool for stripping the outer insulating jacket from a portion of wire or cable as described in claim 1 wherein the resilient biasing means consists of a flexible O-ring.

4. A tool for stripping the outer insulating jacket from a portion of wire or cable as described in claim 1 wherein the elongated body is cylindrical in shape and the passage extends axially through the cylindrical body, being constructed to receive the cable at its forward end.

5. A tool for stripping the outer insulating jacket from a portion of wire or cable as described in claim 4 wherein the elongated cylindrical body is constructed with a recess in its outer surface formed to accomodate the lever arm, the access aperture being constructed at the forward end of said recess.

6. A tool for stripping the outer insulating jacket from a portion of a wire or cable as described in claim 4 wherein the lower surface of the lever arm is angled to provide a pivot point intermediate along its length when positioned in the recess.

* * * * *